(12) United States Patent
Aughton et al.

(10) Patent No.: US 9,615,517 B2
(45) Date of Patent: Apr. 11, 2017

(54) VALVE FOR CONTROLLING FLUID FLOW USING AN INNER COLLAPSIBLE BELLOWS

(71) Applicant: Rubicon Research Pty Ltd, Hawthorn, Victoria (AU)

(72) Inventors: David John Aughton, Hawthorn East (AU); Marius Catrina, Mount Waverley (AU)

(73) Assignee: Rubicon Research Pty Ltd, Hawthorn East, Victoria (AU)

( * ) Notice: Subject to any disclaimer, the term of this patent is extended or adjusted under 35 U.S.C. 154(b) by 0 days.

(21) Appl. No.: 14/783,070

(22) PCT Filed: Apr. 11, 2014

(86) PCT No.: PCT/AU2014/000420
§ 371 (c)(1),
(2) Date: Oct. 7, 2015

(87) PCT Pub. No.: WO2014/169327
PCT Pub. Date: Oct. 23, 2014

(65) Prior Publication Data
US 2016/0044878 A1    Feb. 18, 2016

(30) Foreign Application Priority Data
Apr. 14, 2013    (AU) .................................. 2013205195

(51) Int. Cl.
*F16K 7/14*    (2006.01)
*A01G 25/16*    (2006.01)
(Continued)

(52) U.S. Cl.
CPC ................ *A01G 25/16* (2013.01); *F16K 7/02* (2013.01); *F16K 7/14* (2013.01); *F16K 41/10* (2013.01)

(58) Field of Classification Search
CPC    A01G 25/16; F16K 41/10; F16K 7/02; F16K 7/14; F16K 7/12
(Continued)

(56) References Cited

U.S. PATENT DOCUMENTS 1,859,834 A  *  5/1932  May ........................ F16K 41/10
                                                       251/267
3,146,789 A  *  9/1964  Curth ...................... F16K 21/04
                                                       137/461

(Continued)

FOREIGN PATENT DOCUMENTS

GB          2134220        8/1984
JP          H09187178      7/1997
(Continued)

OTHER PUBLICATIONS

Australian Patent Application No. 2013205195, Patent Examination Report No. 1 mailed Sep. 17, 2013.
(Continued)

*Primary Examiner* — John Bastianelli
(74) *Attorney, Agent, or Firm* — Sheppard, Mullin, Richter & Hampton LLP

(57) ABSTRACT

A valve for controlling fluid flow from an inlet of a pipe fitting to at least one outlet of the pipe fitting at an angle to the inlet. The pipe fitting includes an inner collapsible bellows fixed at a position opposite the inlet. The bellows has a support annulus at the other end adjacent the inlet, whereby, in a closed position, the bellows prevents fluid flow from the inlet to the at least one outlet as the fluid is trapped within the bellows. In an open position, the fluid can flow from the inlet to the at least one outlet when the bellows is collapsed.

20 Claims, 2 Drawing Sheets

(51) Int. Cl.
*F16K 7/02* (2006.01)
*F16K 41/10* (2006.01)

(58) Field of Classification Search
USPC .............................................. 251/335.3, 318
See application file for complete search history.

(56) References Cited

U.S. PATENT DOCUMENTS

| | | | |
|---|---|---|---|
| 3,722,852 A * | 3/1973 | Powell .................. | F16K 17/105 251/175 |
| 4,342,328 A * | 8/1982 | Matta ................... | B60K 15/077 137/135 |
| 5,172,722 A * | 12/1992 | Nishimura ............ | F16K 39/024 137/599.16 |
| 6,305,665 B1 | 10/2001 | Coura et al. | |
| 6,311,950 B1 * | 11/2001 | Kappel .............. | F02M 51/0603 251/129.06 |
| 6,701,958 B2 * | 3/2004 | Baumann ............. | F16K 39/022 137/625.33 |
| 7,461,829 B2 * | 12/2008 | Rule ........................ | F16J 3/041 251/318 |
| 7,862,005 B2 * | 1/2011 | Okitsu ................ | G05D 7/0635 251/214 |
| 2006/0225794 A1 | 10/2006 | Reinicke et al. | |
| 2009/0217988 A1 | 9/2009 | Maxwell | |

FOREIGN PATENT DOCUMENTS

| | | |
|---|---|---|
| JP | 2002256899 | 9/2002 |
| WO | 2012129609 | 10/2012 |
| WO | 2013016769 | 2/2013 |
| WO | 2014082121 | 6/2014 |

OTHER PUBLICATIONS

Australian Patent Application No. 2013205195, Patent Examination Report No. 2 mailed Jun. 11, 2015.
International Application No. PCT/AU2014/000420, International Search Report and Written Opinion mailed Jun. 3, 2014.

* cited by examiner

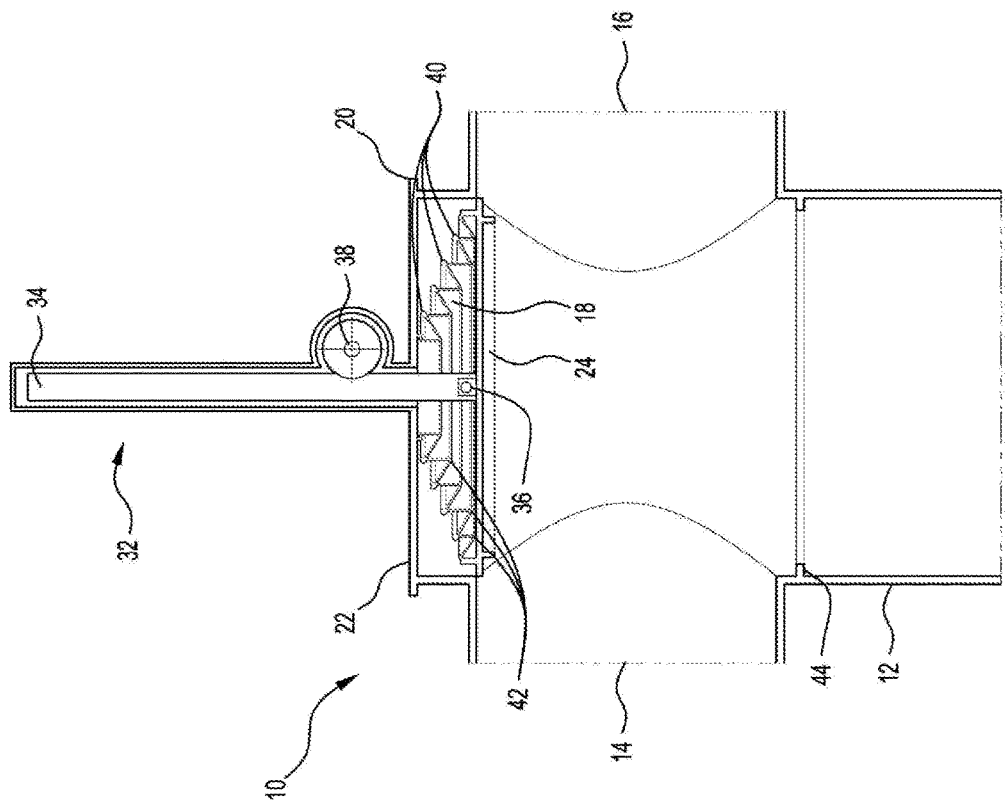
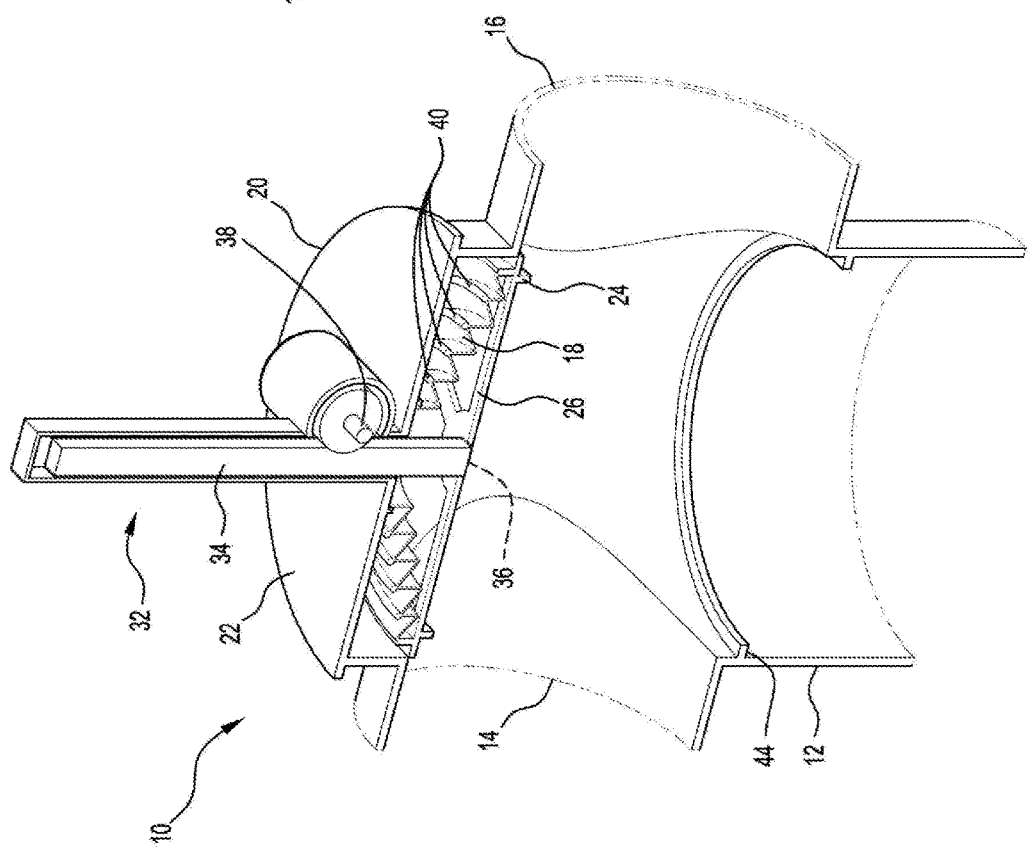

VALVE FOR CONTROLLING FLUID FLOW USING AN INNER COLLAPSIBLE BELLOWS

CROSS-REFERENCE TO RELATED APPLICATIONS

This application is a national stage application pursuant to 35 U.S.C. §371 of International Application No. PCT/AU2014/000420, filed Apr. 11, 2014, which claims priority to Australian Patent Application No. 2013205195, filed Apr. 14, 2013, the disclosures of which are hereby incorporated by reference herein.

FIELD OF THE INVENTION

The present invention relates to a valve for controlling fluid flow from an inlet of a pipe fitting and relates particularly, though not exclusively, to a valve for controlling fluid flow through an irrigation system.

OBJECTS OF THE INVENTION

It is an object of the present invention to provide a valve that is simple to operate in harsh conditions.

A further object of the invention is to provide a simple and reliable valve.

SUMMARY OF THE INVENTION

In a first aspect of the invention there is provided a valve for controlling fluid flow from an inlet of a pipe fitting to at least one outlet of said pipe fitting at an angle to said inlet, said pipe fitting including an inner collapsible bellows fixed at a position opposite said inlet, said bellows having a support annulus at the other end adjacent said inlet, whereby, in a closed position, said bellows prevents fluid flow from said inlet to said at least one outlet as said fluid is trapped within said bellows, and in the open position, said fluid can flow from said inlet to said at least one outlet when said bellows is collapsed.

Preferably said pipe fitting is T-shaped or L-shaped.

In a practical aspect of the invention said bellows has a conical shape. It is preferred that the flared end of said bellows includes said support annulus.

In another aspect of the invention said bellows includes a plurality of rings along the length of said bellows and between folding points to provide strength and ease of folding for said bellows. The valve may include an actuator coupled to said support annulus for providing movement of said support annulus to open and close said valve. Said actuator may have a centrally located arm member which can be driven under computer control to open and close said valve.

In a further practical embodiment said pipe fitting includes an external cap member into which said bellows folds in the closed position.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings:

FIG. 1 is a perspective sectional view of a pipe fitting with a valve shown in the open position;

FIG. 2 is longitudinal cross-sectional view of FIG. 1;

DESCRIPTION OF THE PREFERRED EMBODIMENTS

Figure 3:
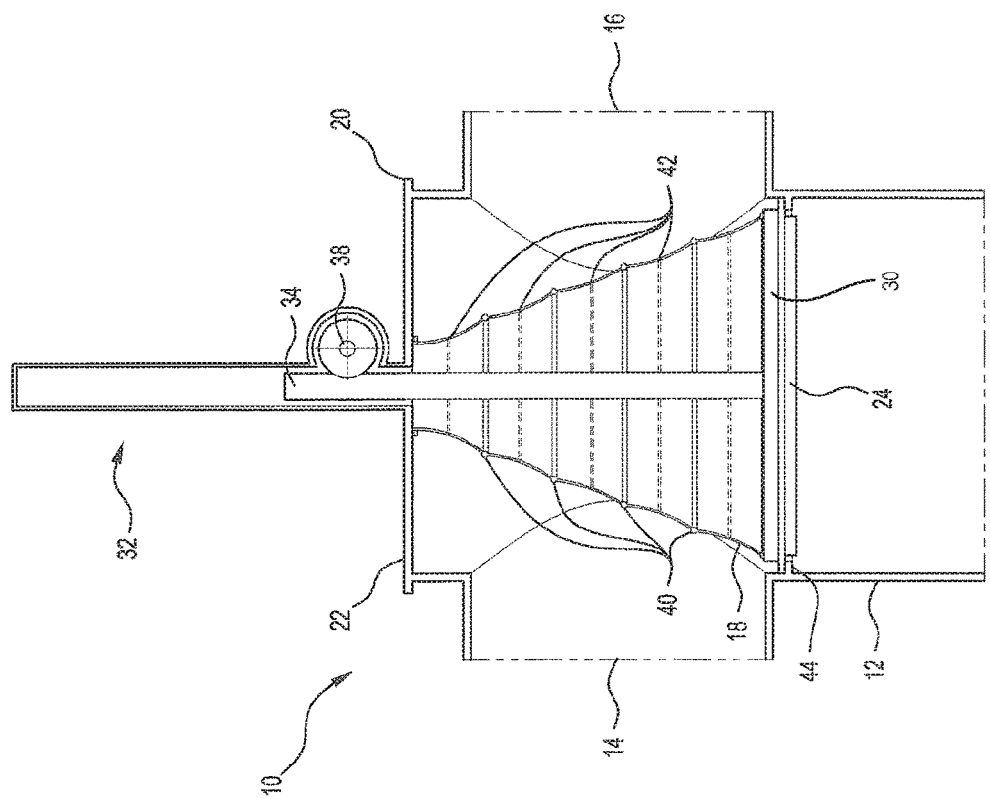
FIG. 3 is a similar view to that of FIG. 1 with the valve shown in the closed position.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

For the purposes of the specification the word "comprising" means "including but not limited to", and the word "comprises" has a corresponding meaning. Also a reference within the specification to document or to prior use is not to be taken as an admission that the disclosure therein constitutes common general knowledge in Australia.

In FIGS. 1 to 4 there is shown a pipe fitting 10 that can be coupled to an irrigation piping system (not shown). Pipe fitting is T-shaped in this embodiment with an inlet 12 and a pair of outlets 14, 16. The shape of pipe fitting 10 can vary, for example, it may be L-shaped in the form of an elbow, or may include additional outlets to suit the environment in which it is to operate. The angle of the inlet 12 to the outlets 14, 16 is usually at right angles but the angle can vary to suit requirements. Typically, pipe fitting 10 is used in the irrigation field and inlet 12 and outlets 14, 16 are coupled to water pipes (not shown). The invention can be used in low head pressure applications as disclosed in Australian Patent Application No. 2012905225, the contents of which are herein incorporated. Water can be diverted at the bifurcation down exits 14, 16 for a T-junction, or just the single exit for an elbow construction. The invention can be included in demand management systems of the type disclosed in International Patent Application No. PCT/AU2012/000907, the contents of which are herein incorporated.

A flexible bellows 18 is fixed to the underneath of cap member 20. Cap member 20 has a cylindrical shape and opens into pipe fitting 10, opposite inlet 12. Cap member 20 may have a removable lid 22 to allow for fitting and maintenance of the valve. Bellows 18 has an annular frame 24 at the other end thereof. Arms 26 radiate from the centre 28 of the annular frame 24 to the annular rim 30. An actuator device 32 is attached to lid 22 and has a linear movable arm 34 connected to the centre 28 of the annular frame 24 at point 36. The actuator device 32 is typically a cable driven mechanism as disclosed in International Patent Application No PCT/AU2012/000328, the contents of which are herein incorporated. Actuator device 32 could be contained within water as part of the T-shaped pipe fitting 10. Actuator device 32 is suited to operation in submersed and harsh environments. Shaft 38 is driven by an electric motor (not shown) that is electronically controlled to cause movement of arm 34. Shaft 38 would have appropriate seals to ensure water is retained in the pipe fitting 10. Any other suitable device that can raise or lower annular frame 24 can be substituted for actuator device 32.

Bellows 18 in this embodiment has a conical shape with the larger diameter affixed to annular rim 30. The reverse configuration could also be adopted, as could a cylindrical shape. The conical shape, as depicted, allows a uniform folding of the bellows 18 into cap member 20. In order to assist the folding of bellows 18 a series of embedded rings 40 are provided between fold lines 42. An internal lip 44 is located within inlet 12 to allow a seal to be maintained in the closed position with annular rim 10 shown in FIGS. 3 and 4. A sealing ring on annular rim 30 that seals against the internal wall of inlet 12 could also substitute for internal lip 44.

Figure 4:
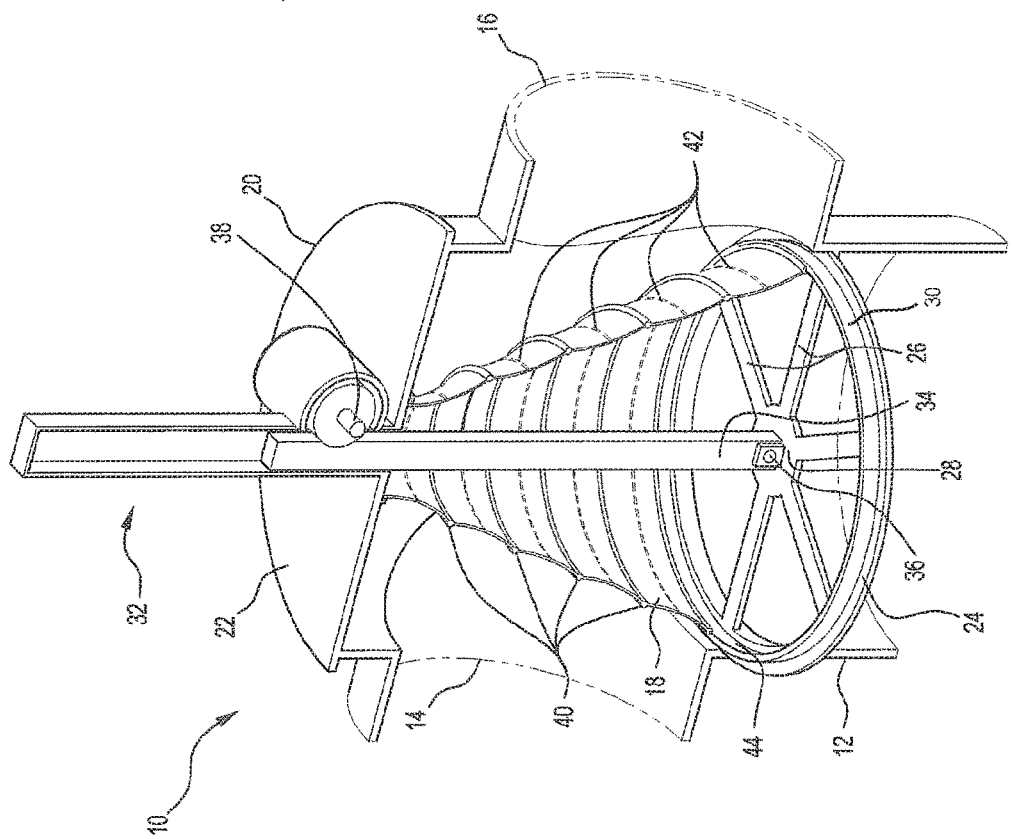
FIG. 4 is a similar view to that of FIG. 2 with the valve shown in the closed position.

The invention is simple in manufacture and provides a reliable operation in the harsh conditions of irrigation systems. FIGS. 3 and 4 show the valve in the closed position. Previously, controlling valves (not shown) coupled to pipes from outlets 14, 16 would be shut before bellows 18 is moved to the closed position. This would ensure the pipes would be full of water. Bellows 18 acts as a gate across outlets 14,16 and water cannot enter from inlet 12. Water flowing into inlet 12 can only enter bellows 18 and, cannot escape. Water pressure will be maintained external and internal of bellows 18. Accordingly, the force required to seal against the pressure in inlet 12 is less than that necessary to force annular rim 30 against lip 44. When arm 34 lifts annular frame 24 from lip 44, water can flow from inlet 12 to outlets 14, 16. Bellows 18 will fold into cap member 22 as shown in FIGS. 1 and 2 to maximise the flow of water.

Further advantages and improvements may very well be made to the present invention without deviating from its scope. Although the invention has been shown and described in what is conceived to be the most practical and preferred embodiment, it is recognised that departures may be made therefrom within the scope and spirit of the invention, which is not to be limited to the details disclosed herein but is to be accorded the full scope of the claims so as to embrace any and all equivalent devices and apparatus.

The invention claimed is:

1. A valve for controlling fluid flow from an inlet of a pipe fitting to at least one outlet of said pipe fitting at an angle to said inlet, said pipe fitting including an inner collapsible bellows fixed at a position opposite said inlet, said bellows having a support annulus at the other end adjacent said inlet, whereby, in a closed position, said support annulus seals the inlet and said bellows prevents fluid flow from said inlet to said at least one outlet as said fluid is trapped within said bellows, and in an open position, said fluid can flow from said inlet to said at least one outlet when said bellows is collapsed.

2. The valve as claimed in claim 1, wherein said pipe fitting is T-shaped.

3. The valve as claimed in claim 1, wherein said pipe fitting is L-shaped.

4. The valve as claimed in claim 1, wherein said bellows has a conical shape.

5. The valve as claimed in claim 4, wherein a flared end of said bellows includes said support annulus.

6. The valve as claimed in claim 1, wherein said bellows has a cylindrical shape.

7. The valve as claimed in claim 1, wherein said bellows includes a plurality of rings along a length of said bellows and between folding points to provide strength and ease of folding for said bellows.

8. The valve as claimed in claim 1, further including an actuator coupled to said support annulus for providing movement of said support annulus to open and close said valve.

9. The valve as claimed in claim 8, wherein said actuator has a centrally located arm member which can be operated under computer control to open and close said valve.

10. The valve as claimed in claim 1, wherein said inlet includes an annular lip to allow sealing with said support annulus.

11. The valve as claimed in claim 1, wherein said support annulus is adapted to seal with an inner periphery of said inlet.

12. The valve as claimed in claim 1, wherein said pipe fitting includes an external cap member into which said bellows folds in the closed position.

13. The valve as claimed in claim 2, wherein said bellows has a cylindrical shape.

14. The valve as claimed in claim 2, wherein said bellows has a conical shape.

15. The valve as claimed in claim 14, wherein a flared end of said bellows includes said support annulus.

16. The valve as claimed in claim 3, wherein said bellows has a cylindrical shape.

17. The valve as claimed in claim 3, wherein said bellows has a conical shape.

18. The valve as claimed in claim 17, wherein a flared end of said bellows includes said support annulus.

19. The valve as claimed in claim 7, wherein said pipe fitting is T-shaped or L-shaped.

20. The valve as claimed in claim 7, wherein said bellows has a cylindrical shape or a conical shape.

* * * * *